United States Patent Office

> 3,361,642
> Patented Jan. 2, 1968

3,361,642
METHOD FOR PRODUCING HYPOXANTHINE BY FERMENTATION
Shukuo Kinoshita and Takashi Nara, Tokyo, and Masanaru Misawa, Kawasaki-shi, Japan, assignors to Kyowa Hakko Kogyo Co., Ltd., Tokyo, Japan, a corporation of Japan
No Drawing. Filed Sept. 28, 1964, Ser. No. 399,886
Claims priority, application Japan, Oct. 16, 1963, 38/54,728
6 Claims. (Cl. 195—28)

This invention relates to a method for producing hypoxanthine by fermentation. More particularly, this invention relates to an improved method for producing hypoxanthine by accumulating it in large amount directly in cells of the microorganisms employed in the culturing process used, the hypoxanthine being also accumulated in the culture media.

It is known to produce hypoxanthine fermentatively. Such a method is disclosed in Japanese Patent Publication No. 1963-12135, and also involves the accumulation of a considerable amount of hypoxanthine directly in the bodies of the microorganisms employed in the culturing process as well as in the culture media. The microorganisms employed in the said method are selected from those belonging extensively to bacteria, yeasts, and molds; if desired, these microorganisms may be subjected to a mutation-inducing treatment. However, the said method still leaves something to be desired from the standpoint of yield of hypoxanthine.

A primary object of the present invention is the embodiment of an improved method for the production of hypoxanthine by fermentation. More specifically, the object is to realize enhanced yields of hypoxanthine.

This object is realized according to the present invention, briefly stated, by the expedient of carrying out the culturing of the hypoxanthine-producing microorganisms in a culture medium which contains two types of vitamins: (a) pantothenic acid (vitamin $B_5$) or related compounds, as e.g. those hereinafter enumerated, or natural substances containing pantothenic acid or the said related compounds, and (b) thiamine (vitamin $B_1$) or its related compounds or natural substances containing any of these.

According to the present invention, microorganisms capable of producing hypoxanthine are cultured while using, as fermentation media, pure synthetic media containing carbon source, inorganic nitrogen source, inorganic compounds, compounds capable of meeting nutritional requirements in cases where the strains used are auxotrophic mutants, etc. and also containing two types of vitamins (a) and (b), supra, whereupon hypoxanthine accumulates in the cells of the microorganisms and in the culture media in surprisingly high yield.

It is to be understood that a natural culture medium is also effective and is intended to be included within the scope of this invention when it contains pantothenic acid or its related compound and thiamine or its related compound.

Pantothenic acid and thiamine both belong to the water-soluble vitamin B group. The physiological function of the former coincides with that of coenzyme A (CoA) bio-synthetized from pantothenic acid. The pantothenic acid related substances are compounds involved in CoA bio-synthesis, e.g. pantothenic acid, β-alanine, pantethine, pantoic acid, aspartic acid, valine, dimethyl pyruvic acid, α-ketopantoic acid, pantothenyl cysteine, D(+)-4-phosphopantethine, diphosphoCoA, CoA, etc. Derivatives of these compounds e.g. such as β-alanine-containing carnosine and anserine and natural substances containing these compounds e.g. such as yeast extract, corn steep liquor, fish solubles, meat extract, rise bran, molasses, liver extract, peptone, NZ amine, distillers solubles, etc. are also useful.

Thiamine has a structure consisting of a pyrimidine part and a thiazole part, both of which are bio-synthetized and united to yield ultimately thiamine. According to the microorganisms employed, these two parts severally or either of these two parts can be substituted for thiamine. In the case of such a microorganism, it is possible to use both or either of the pyrimidine part and the thiazole part. It is also possible to use derivatives of these compounds or natural substances containing these compounds such as yeast extract, corn steep liquor, meat extract, rice bran, molasses, etc.

Thus the most significant feature of the present invention is that pantothenic acid or its related compound and thiamine or its related compound are included in a culture medium in which a microorganism capable of producing hypoxanthine is cultured to accumulate hypoxanthine. The remarkable promoting effect of the two vitamins or their related compounds in the formation and accumulation of purine base is a fact unknown heretofore and is extremely interesting also in the field of biochemistry.

The microorganisms employed in the present method are those belonging to *Brevibacterium ammoniagenes*, *Bacillus subtilis*, *Saccharomyces cerevisae* and *Neurospora crassa*.

Since *B. ammoniagenes* and *N. crassa* require biotin for their growth, it is essential to add an appropriate amount of biotin to their media, no matter which strain is employed among mutants of both cultures. Furthermore, in those mutant cultures which require adenine or some amino acid for their growth, these compound or natural substances containing these must be supplemented to their media in the most suitable amounts.

A more comprehensive understanding of the invention can be obtained by referring to the following illustrative but non-limitative examples of the invention.

EXAMPLE 1

Using, as a seed culture, *Brevibacterium ammoniagenes* No. 7209, grown seed was prepared by culturing for 25 hours in a medium having a pH of 7.3 and containing 2 percent by weight of glucose, 2 percent by weight of casamino acids (no vitamin content), 0.1 percent by weight of urea, 0.1 percent by weight of $K_2HPO_4$, 0.03 percent by weight of $MgSO_4 \cdot 7H_2O$, 0.3 percent by weight of NaCl, 0.01 percent by weight of $FeSO_4 \cdot 7H_2O$, 0.01 percent by weight of $CaCl_2 \cdot 2H_2O$, 30 milligrams/liter of biotin, and 50 milligrams/liter of adenine. This seen medium was inoculated into a fermentation medium, in an amount of 10 percent by volume of seed medium relative to the volume of the fermentation medium. Both media were used after being divided into 20 milliliter portions, poured in 250 milliliter conical flasks and sterilized. Using a fermentation medium having the following composition, shaking culture was performed at a temperature of 30° C. The fermentation medium contained 10 percent by weight of glucose, 0.05 percent by weight of $K_2HPO_4$, 0.05 percent by weight of $KH_2PO_4$, 0.4 percent by weight of $MgSO_4 \cdot 7H_2O$, 0.01 percent by weight of $CaCl_2 \cdot 2H_2O$, 50 milligrams/liter of adenine, 30 milligrams/liter of biotin, and 2.5 milligrams/milliliter of calcium pantothenate, the pH being adjusted to 8.0 before sterilization. After sterilization, individually sterilized urea and thiamine hydrochloride were added to the above-mentioned medium to give 0.6 percent by weight and 2.5 micrograms/milliliter respectively. After 72 hours of culture, there were accumulated. Accordingly 9.7 milligrams/milliliter of hypoxanthine were accumulated in all.

The relation between the amounts of pantothenic acid and thiamine added to the medium and the total amount of hypoxanthine formed, when otherwise proceeding according to the example, are shown in Table 1.

Table 1

| Amount of pantothenic acid added to the medium, micrograms per milliliter | Amount of thiamine hydrochloride added to the medium, micrograms per milliliter | Total amount of hypoxanthine formed, milligrams per milliliter |
| --- | --- | --- |
| 0.0 | 0.0 | Trace |
| 0.0 | 2.5 | Trace |
| 2.5 | 0.0 | Trace |
| 2.5 | 2.5 | 9.7 |
| 5.0 | 2.5 | 9.5 |
| 2.5 | 5.0 | 9.8 |
| 5.0 | 5.0 | 9.5 | there were accumulated [4.9 milligrams/milliliter of hypoxanthine in the fermented liquor and 4.8 milligrams/milliliter of crystalline hypoxanthine in the cells of the microorganism and in the insoluble matter present].

EXAMPLE 2

Using, as a seed culture, Brevibacterium ammoniagenes No. 7208–38A (a strain derived from strain No. 7208 and capable of growing without adenine), and as a seed medium and a fermentation medium the same as in Example 1 except that adenine was omitted from both media and 2.5 micrograms/milliliter of β-alanine instead of calcium pantothenate, and 2.5 micrograms/milliliter of thiamine hydrochloride were added to the fermentation medium, culture was performed according to the same method as in Example 1, whereby 10.9 milligrams/milliliter of hypoxanthine were accumulated. Compared with the case when no β-alanine was added and the formation of hypoxanthine was only trace, the promoting effect of β-alanine was apparent.

EXAMPLE 3

Using the same seed culture and the same medium as in Example 2 and as a fermentation medium, a medium to which there was added 1 percent by weight of rice bran containing a sufficient amount of calcium pantothenate and thiamine instead of these two vitamine themselves in Example 2, culture was performed according to the same method as in Example 1, whereby 11.2 milligrams/milliliter of hypoxanthine were accumulated.

EXAMPLE 4

Using, as a seed culture, Brevibacterium ammoniagenes No. 7249 (a strain requiring adenine and leucine for its growth), and a seed medium and a fermentation medium the same as in Example 1 except that 100 micrograms/milliliter of L-leucine, 0.2 percent of corn steep liquor and 2.5 micrograms/milliliter of thiamine hydrochloride, were added to both media and 30 micrograms/milliliter of pantethine were added to the fermentation medium instead of calcium pantothenate, culture was performed according to the same method as in Example 1, where by 8.9 milligrams/milliliter of hypoxanthine were accumulated.

EXAMPLE 5

Using, as a seed culture Bacillus subtilis No. A1626 strain and as a fermentation medium, one which contains 10 percent by weight of soluble starch, 1 percent by weight of $NH_4Cl$, 0.2 percent by weight of $KH_2PO_4$, 0.2 percent by weight of $K_2HPO_4$, 0.4 percent by weight of $MgSO_4 \cdot 7H_2O$, 50 milligrams/liter of adenine and 30 micrograms/milliliter of coenzyme A, culture was performed according to the method of Example 1. When thiamine hydrochloride was added to the above-mentioned medium, the amount of hypoxanthine formed after 120 hours of culture was as shown in Table 2.

Table 2

| Amount of thiamine hydrochloric acid added to the medium, μg./ml.: | Total amount of hypoxanthine formed, mg./ml. |
| --- | --- |
| 0.0 | Trace |
| 0.5 | 0.9 |
| 2.5 | 2.9 |
| 5.0 | 4.7 |
| 10.0 | 4.6 |

EXAMPLE 6

As a seed culture, Saccharomyces cerevisiae No. 361220 and as a fermentation medium, one to which there were added individually sterilized 6 percent by weight of glucose, 1.2 percent by weight of $NH_4Cl$, 0.1 percent by weight of $KH_2PO_4$, 0.1 percent by weight of $K_2HPO_4$, 0.2 percent by weight of $MgSO_4 \cdot 7H_2O$, 200 micrograms/milliliter of L-alginine and 5 micrograms/milliliter of calcium pantothenate and also individually sterilized 1.0 microgram/milliliter of 2 - methyl-4-amino-5-hydroxymethyl pyrimidine and 0.8 microgram/milliliter of 4-methyl-5β-hydroxyethylthiazole instead of thiamine, were used, and culture was otherwise performed according to the same method as in Example 2. After 120 hours of culture, 3.8 milligrams/milliliter of hypoxanthine were formed.

EXAMPLE 7

As a seed culture, Neurospora crassa No. 62103 and as a fermentation medium, a medium according to Example 5, but omitting L-alginine and replacing the thiamine-related compound of Example 5 by 5 micrograms/milliliter of thiamine hydrochloride and 20 milligrams/liter of biotin, were used, and culture was otherwise performed according to the same method as in Example 2. After 120 hours of culture, 15 milligrams/milliliter of hypoxanthine were formed.

Cultures of the several microorganisms are on deposit at the American Type Culture Collection, Rockville, Md., having the accession numbers shown in the following:

| Microorganism: | Accession number |
| --- | --- |
| Brevibacterium ammoniagenes No. 7209 | 15510 |
| Brevibacterium ammoniagenes No. 7208–38A | 15312 |
| Bacillus subtilis No. A1626 | 15512 |
| Saccharomyces cerevisiae No. 361220 | 15513 |
| Neurospora crassa No. 62103 | 15514 |
| Brevibacterium ammoniagenes No. 7249 | 15511 |

What is claimed is:
1. A method for producing hypoxanthine by culturing Brevibacterium ammoniagenes ATCC No. 15510 in a medium containing
    (a) an amount of 2.5 to 30 micrograms per milliliter of medium of a member selected from the group consisting of pantothenic acid, β-alanine, pantethine, pantoic acid, aspartic acid, valine, dimethyl pyruvic acid, α-ketopantoic acid, pantothenyl cysteine, D(+)-4-phosphopantethine, diphosphoCoenzyme A, Coenzyme A, and
    (b) an amount of 2.5 to 10 micrograms per milliliter of medium of a member selected from the group consisting of thiamine, thiamine hydrochloride, and sufficient amounts of 2-methyl-4-amino-5-hydroxymethyl pyrimidine and 4-methyl-5β-hydroxyethylthiazole to form an equivalent amount of thiamine in the said medium together with carbon, nitrogen, inorganic salt, biotin and adenine sources, and recovering the accumulated hypoxanthine from the medium.

2. A method for producing hypoxanthine by culturing Brevibacterium ammoniagenes ATCC No. 15312 in a medium containing
    (a) an amount of 2.5 to 30 micrograms per milliliter of medium of a member selected from the group consisting of pantothenic acid, β-alanine, pantethine, pantoic acid, aspartic acid, valine, dimethyl pyruvic acid, α-ketopantoic acid, pantothenyl cysteine, D(+) - 4 - phosphopantethine, diphosphoCoenzyme A, Coenzyme A, and (b) an amount of 2.5 to 10 micrograms per milliliter of medium of a member selected from the group consisting of thiamine, thiamine hydrochloride, and sufficient amounts of 2-methyl-4-amino-5-hydroxymethyl pyrimidine and 4 - methyl-5β-hydroxyethylthiazole to form an equivalent amount of thiamine in the said medium together with carbon, nitrogen, inorganic salt and biotin, and recovering the accumulated hypoxanthine from the medium.

3. A method for producing hypoxanthine by culturing *Brevibacterium ammoniagenes* ATCC No. 15511 in a medium containing (a) an amount of 2.5 to 30 micrograms per milliliter of medium of a member selected from the group consisting of pantothenic acid, β-alanine, pantethine, pantoic acid, aspartic acid, valine, dimethyl pyruvic acid, α-ketopantoic acid, pantothenyl cysteine, D(+)-4-phosphopantethine, diphosphoCoenzyme A, Coenzyme A, and (b) an amount of 2.5 to 10 micrograms per milliliter of medium of a member selected from the group consisting of thiamine, thiamine hydrochloride, and sufficient amounts of 2-methyl-4-amino-5-hydroxymethyl pyrimidine and 4-methyl-5β-hydroxyethylthiazole to form an equivalent amount of thiamine in the said medium together with biotin, adenine and leucine sources and recovering the accumulated hypoxanthine from the medium.

4. A method for producing hypoxanthine by culturing *Bacillus subtilis* ATCC No. 15512 in a medium containing (a) an amount of 2.5 to 30 micrograms per milliliter of medium of a member selected from the group consisting of pantothenic acid, β-alanine, pantethine, pantoic acid, aspartic acid, valine, dimethyl pyruvic acid, α-ketopantoic acid, pantothenyl cysteine, D(+)-4-phosphopantethine, diphosphoCoenzyme A, Coenzyme A, and (b) an amount of 2.5 to 10 micrograms per milliliter of medium of a member selected from the group consisting of thiamine, thiamine hydrochloride, and sufficient amounts of 2-methyl-4-amino-5-hydroxymethyl pyrimidine and 4 - methyl-5β-hydroxyethylthiazole to form an equivalent amount of thiamine in the said medium together with carbon, nitrogen, inorganic salt, and adenine sources, and recovering the accumulated hypoxanthine from the medium.

5. A method for producing hypoxanthine by culturing *Sacchromyces cerevisiae* ATCC No. 15513 in a medium containing (a) an amount of 2.5 to 30 micrograms per milliliter of medium of a member selected from the group consisting of pantothenic acid, β-alanine, pantethine, pantoic acid, aspartic acid, valine, dimethyl pyruvic acid, α-ketopantoic acid, pantothenyl cysteine, D(+)-4-phosphopantethine, diphosphoCoenzyme A, Coenzyme A, and (b) an amount of 2.5 to 10 micrograms per milliliter of medium of a member selected from the group consisting of thiamine, thiamine hydrochloride, and sufficient amounts of 2-methyl-4-amino-5-hydroxymethyl pyrimidine and 4 - methyl-5β-hydroxyethylthiazole to form an equivalent amount of thiamine in the said medium together with carbon, nitrogen, inorganic salt, and adenine sources, and recovering the accumulated hypoxanthine from the medium, together with carbon, nitrogen, inorganic salt and arginine sources, and recovering the accumulated hypoxanthine from the medium.

6. A method for producing hypoxanthine by culturing *Neurospora crassa* ATCC No. 15514 in a medium containing (a) an amount of 2.5 to 30 micrograms per milliliter of medium of a member selected from the group consisting of pantothenic acid, β-alanine, pantethine, pantoic acid, aspartic acid, valine, dimethyl pyruvic acid, α-ketopantoic acid, pantothenyl cysteine, D(+)-4-phosphopantethine, diphosphoCoenzyme A, Coenzyme A, and (b) an amount of 2.5 to 10 micrograms per milliliter of medium of a member selected from the group consisting of thiamine, thiamine hydrochloride, and sufficient amounts of 2-methyl-4-amino-5-hydroxymethyl pyrimidine and 4-methyl-5β-hydroxyethylthiazole to form an equivalent amount of thiamine in the said medium together with carbon, nitrogen, and inorganic salt sources and recovering the accumulated hypoxanthine from the medium.

References Cited
UNITED STATES PATENTS
3,118,820  1/1964  Uchida et al. _____ 195—28

ALVIN E. TANENHOLTZ, *Primary Examiner.*